L. M. BOWMAN.
GLASS COFFEE URN.
APPLICATION FILED JUNE 22, 1915.
1,183,721.
Patented May 16, 1916.
2 SHEETS—SHEET 1.
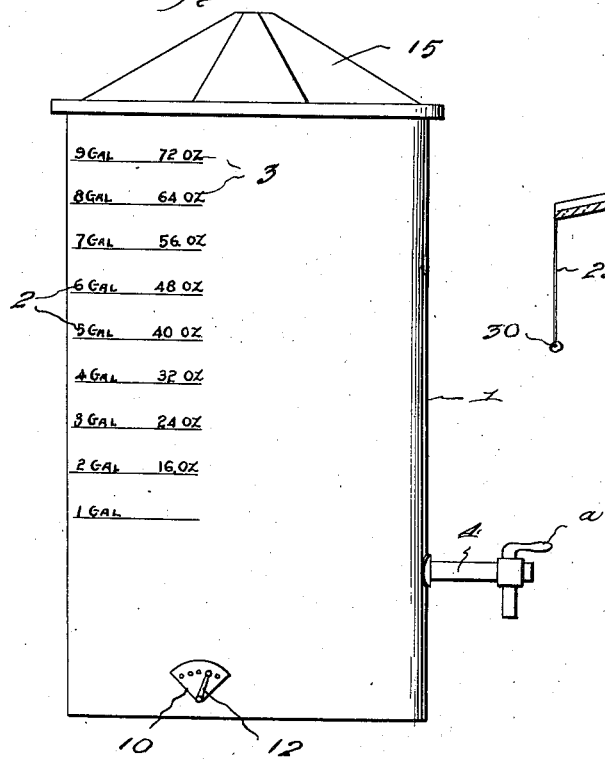
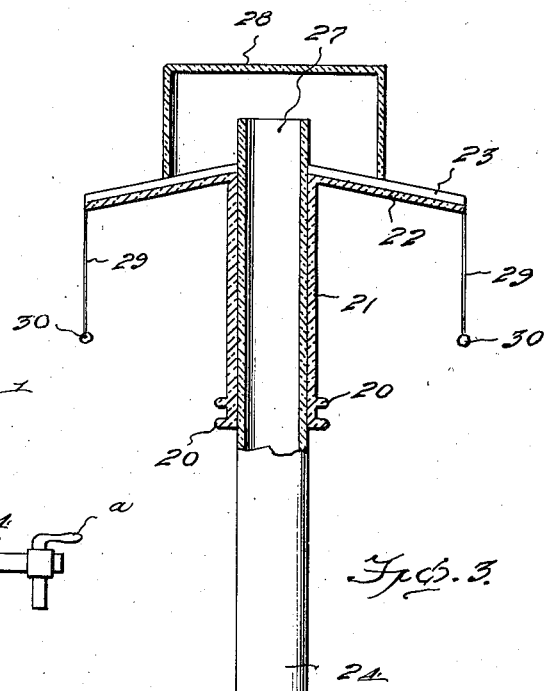
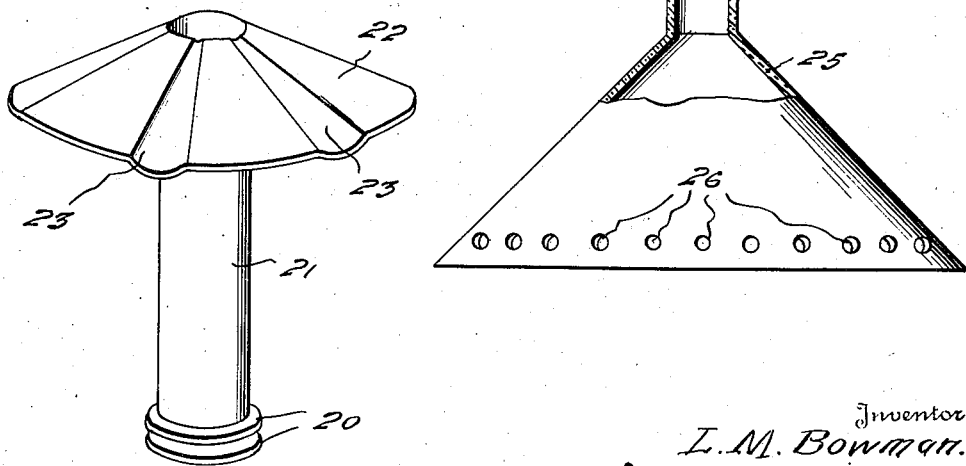
Inventor
L. M. Bowman.

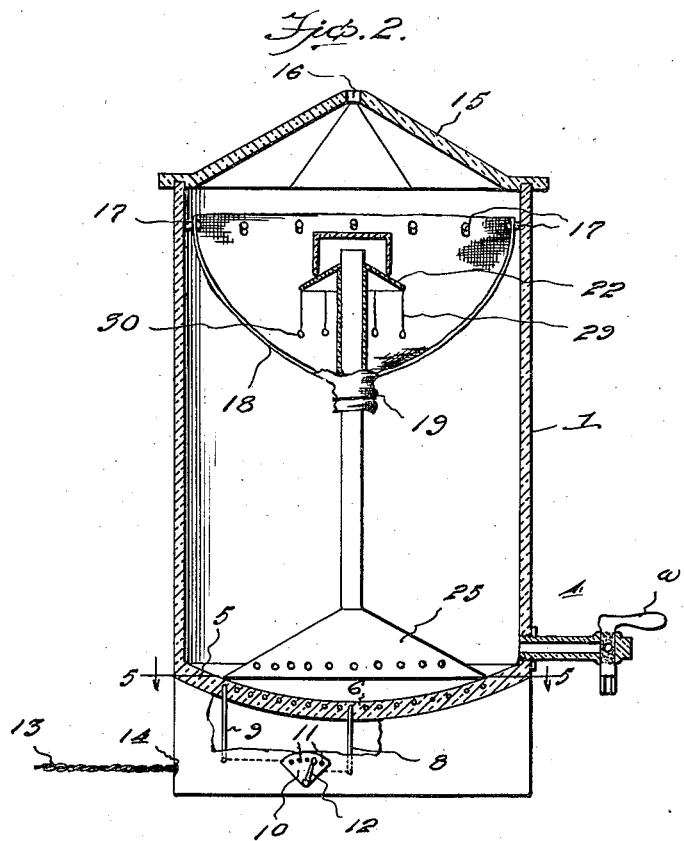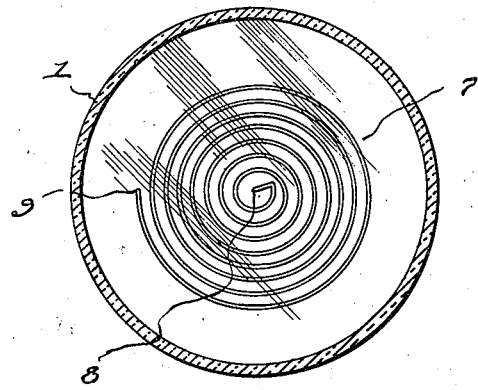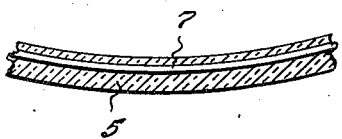

UNITED STATES PATENT OFFICE.

LEVI M. BOWMAN, OF TULSA, OKLAHOMA, ASSIGNOR OF ONE-HALF TO E. E. MINTON, OF OKLAHOMA, OKLAHOMA.

GLASS COFFEE-URN.

1,183,721. Specification of Letters Patent. Patented May 16, 1916.

Application filed June 22, 1915. Serial No. 35,520.

*To all whom it may concern:*

Be it known that I, LEVI M. BOWMAN, a citizen of the United States, residing at Tulsa, in the county of Tulsa and State of Oklahoma, have invented certain new and useful Improvements in Glass Coffee-Urns; and I do hereby declare the following to be a full, clear, and exact description of the invention, such as will enable others skilled in the art to which it appertains to make and use the same.

This invention relates to glass coffee urns, and one of the principal objects of the invention is to entirely eliminate the use of metal in the construction of the urn.

It is a well known fact that metal coffee urns and percolators are deleterious for the reason that there is a chemical re-action in coffee made in metal receptacles. The poisonous oil of coffee gathers at the corners and angles and is not only injurious but destroys the flavor of the coffee. Moreover the dregs of the coffee gather and unite with the oil to make the coffee bitter and unpalatable.

Another object of the invention is to provide a combined coffee percolator and urn entirely of glass which will keep the liquid coffee in good condition almost indefinitely.

Still another object of the invention is to provide a glass coffee urn and percolator which is heated by a resistance coil embedded in the bottom or base of the urn and provided with conductors leading to a source of supply.

Another object is to provide a controller for the resistance coil, in order that any desired degree of heat may be maintained.

Another object of the invention is to provide a coffee urn and percolator in which the interior parts may be quickly removed so that the entire device may be thoroughly cleaned.

The foregoing and other objects may be attained by means of the construction illustrated in the accompanying drawings, in which:

Figure 1 is a side elevation of a coffee urn made in accordance with this invention. Fig. 2 is a vertical sectional view of the same. Fig. 3 is a vertical sectional view of the percolator or circulating device for the liquid coffee. Fig. 4 is a detail perspective view of the hot water drain and device to which the coffee sack is secured. Fig. 5 is a horizontal sectional view taken on the line 5—5 of Fig. 2, looking in the direction indicated by the arrow, and Fig. 6 is a detail sectional view of a portion of the false bottom, and showing the disposition of the resistance coil embedded therein.

Referring to the drawing the numeral 1 designates a glass urn of the desired size and capacity, said urn upon its outer side having a series of indicating marks 2 for designating the quantity of liquid in the urn and running from one to nine gallons, as shown, while at the right the number of ounces are indicated, as shown at 3. A glass faucet 4 communicates with the tank 1. A bottom 5 formed integral with the urn 1 is provided with a concaved upper surface 6 and embedded within the bottom 5 is an electric resistance coil 7, one terminal 8 of which extends through the lower side of the bottom 5 at the center thereof and the other terminal 9 extends through the bottom at a point near the outer edge thereof. A controller 10 having a series of contacts 11 is provided with a pivoted switch 12 and conductors 13 leading from the switch out through an opening 14 in the side wall of the urn below the bottom 5.

A glass cover 15 is fitted over the top of the urn and is provided with a vent opening 16. A series of hooks or buttons 17 formed integral with and extending inwardly from the inner wall of the urn 1 are for the purpose of suspending a fabric coffee sack or bag 18. The sack 18 is provided with a central opening which is closed by a drawstring 19 to hold the sack between the spaced flanges 20 formed upon a tube 21 having a substantially frusto-conical liquid drain 22 at the upper end thereof. The drain 22 inclines from the tube 21 outwardly and downwardly and is provided with a series of depressed troughs or gutters 23.

Fitted within the tube 21 is a tubular percolator 24 having a flaring bell 25 at its lower end, said bell being provided with a series of perforations 26 near its lower open end. The upper end of the tube 24 extends above the drain 22 and is provided with an outlet opening 27. A glass deflector 28 fits over the outlet end 27 of the tube 24, and rests on the upper surface of the drain 22. A series of depending dripping elements 29 are suspended from the outer edge of the drain 22 and may be provided with glass balls 30 at their free ends.

The operation of the invention may be briefly described as follows: The coffee is placed in the sack 18 and cold or hot water is poured over the coffee and allowed to drip down onto the bottom 5. When the current is turned into the resistance coil and the water is boiled above the bottom 5 the boiling water will be forced up through the tube 24 and out at 27, where it will be deflected by the element 28 to pass through the channels or gutters 23 back again into the urn 1 above the bottom 5, and this operation will continue until the entire strength and flavor have been extracted from the coffee. By means of the controller the coffee in the urn may be kept at any desired degree of heat below the boiling point and may be dispensed through the glass faucet 4 by turning the handle $a$.

Various changes may be made in the details of construction without departing from the spirit and scope of the invention as defined in the claims.

What is claimed is:

1. A coffee urn including a perforated bell, a tube rising vertically from the bell, a sack secured to and suspended from the urn, the upper end of the tube entering the sack, a substantially frusto-conical drain mounted upon the upper end of the tube and dripping elements suspended from the drain.

2. A coffee urn including a perforated bell, a tube rising vertically from the bell, a sack secured to and suspended from the urn, the upper end of the tube entering the sack, a substantially frusto-conical drain mounted upon the upper end of the tube and a deflector fitted over the upper end of the tube and resting upon the upper surface of the drain.

3. A coffee urn including a perforated bell, a tube rising vertically from the bell, a sack secured to and suspended from the urn, the upper end of the tube entering the sack, and a substantially frusto-conical drain having a tube secured to and depending from the concave face slidably receiving the first named tube, said last named tube provided with a pair of spaced flanges at its lower end to receive the ends of the sack therearound, the drain being also provided with a series of troughs or gutters.

In testimony whereof I affix my signature in presence of two witnesses.

LEVI M. BOWMAN.

Witnesses:
W. C. DAVIS,
BENNETT S. JONES.